United States Patent
Kim et al.

(10) Patent No.: US 9,670,349 B2
(45) Date of Patent: Jun. 6, 2017

(54) PVC FOAM PROCESSING AID, METHOD FOR PREPARING THE SAME AND POLYVINYL CHLORIDE RESIN COMPOSITION COMPRISING THE SAME

(71) Applicant: LG CHEM, LTD., Seoul (KR)

(72) Inventors: Yoon Ho Kim, Daejeon (KR); Geon-soo Kim, Daejeon (KR); Kwang Jin Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 492 days.

(21) Appl. No.: 14/353,975

(22) PCT Filed: Dec. 18, 2013

(86) PCT No.: PCT/KR2013/011817
§ 371 (c)(1),
(2) Date: Apr. 24, 2014

(87) PCT Pub. No.: WO2014/133254
PCT Pub. Date: Sep. 4, 2014

(65) Prior Publication Data
US 2016/0333176 A1    Nov. 17, 2016

(30) Foreign Application Priority Data

Feb. 28, 2013   (KR) .................. 10-2013-0021870
Dec. 10, 2013   (KR) .................. 10-2013-0153182

(51) Int. Cl.
| | |
|---|---|
| *C08L 25/12* | (2006.01) |
| *C08F 212/10* | (2006.01) |
| *C08J 9/00* | (2006.01) |
| *C08F 257/00* | (2006.01) |
| *C08J 9/10* | (2006.01) |
| *C08G 101/00* | (2006.01) |

(52) U.S. Cl.
CPC .......... *C08L 25/12* (2013.01); *C08F 212/10* (2013.01); *C08F 257/00* (2013.01); *C08J 9/0061* (2013.01); *C08J 9/103* (2013.01); *C08G 2101/00* (2013.01); *C08G 2150/60* (2013.01); *C08J 2201/03* (2013.01); *C08J 2203/04* (2013.01); *C08J 2327/06* (2013.01); *C08J 2425/12* (2013.01); *C08J 2433/08* (2013.01); *C08J 2433/10* (2013.01)

(58) Field of Classification Search
CPC .......... C08L 25/12; C08L 27/08; C08L 33/12; C08L 51/003; C08L 27/06; C08F 212/10; C08F 257/00; C08F 2220/1825
See application file for complete search history.

(56) References Cited

U.S. PATENT DOCUMENTS

| | | | |
|---|---|---|---|
| 6,221,966 B1 | 4/2001 | Nakanishi et al. | |
| 6,391,976 B1 | 5/2002 | Naka et al. | |
| 2004/0192794 A1* | 9/2004 | Patterson et al. | C08L 97/02 521/84.1 |
| 2005/0137341 A1* | 6/2005 | Hawrylko et al. | C08L 27/06 525/205 |

FOREIGN PATENT DOCUMENTS

| | | |
|---|---|---|
| KR | 10-0179356 | 5/1999 |
| KR | 10-0225271 | 10/1999 |
| KR | 10-2001-0015640 | 2/2001 |
| KR | 10-2006-0107084 | 10/2006 |
| KR | 10-0871560 | 12/2008 |

* cited by examiner

*Primary Examiner* — Nathan M Nutter
(74) *Attorney, Agent, or Firm* — Dentons US LLP

(57) ABSTRACT

Disclosed are a PVC foam processing aid, a method for preparing the same, and a polyvinyl chloride resin composition comprising the same. More specifically, provided are a PVC foam processing aid and a polyvinyl chloride resin composition exhibiting superior aggregation property and improving foam moldability of polyvinyl chloride (PVC) resins, prepared therefrom.

19 Claims, No Drawings

PVC FOAM PROCESSING AID, METHOD FOR PREPARING THE SAME AND POLYVINYL CHLORIDE RESIN COMPOSITION COMPRISING THE SAME

This application is a 35 USC §371 National Stage entry of International Application No. PCT/KR2013/011817, filed on Dec. 18, 2013, which claims priority from Korean Patent Application Nos. 10-2013-0021870, filed on Feb. 28, 2013 and 10-2013-0153182, filed on Dec. 10, 2013, in the Korean Intellectual Property Office, all of which are incorporated herein by reference in their entirety.

TECHNICAL FIELD

The present invention relates to a PVC foam processing aid, a method for preparing the same and a polyvinyl chloride resin composition. More specifically, the present invention relates to a PVC foam processing aid which exhibits superior aggregation property and improves foam moldability of polyvinyl chloride (PVC) resins, a method for preparing the same and a polyvinyl chloride resin composition comprising the same.

BACKGROUND ART

A polyvinyl chloride (PVC) resin is a polymer containing 50% or more of vinyl chloride, which is widely utilized in a variety of fields, because it is cheap, hardness thereof is easily controlled and it is applicable to most processed apparatuses and provides molded articles with superior physical and chemical properties.

However, because a polyvinyl chloride resin has poor impact strength, workability, thermal stability and heat deflection temperature, additives to address these problems are developed. For example, additives such as impact modifiers, processing aids, stabilizers and fillers are suitably selected according to applications thereof.

In recent years, interest in foam molding as a method for reducing weight of polyvinyl chloride resins and lowering price of molded articles has increased. For reference, when polyvinyl chloride is foam-molded alone, there are disadvantages in that sufficient elongation and melt strength cannot be obtained and appearance of molded articles is thus bad, and foam cells are large and non-uniform and foaming magnitude is thus low.

Accordingly, in order to solve these disadvantages, addition of a mixture of a high-molecular weight acrylate processing aid containing methyl methacrylate as a predominant component and a foaming agent, to polyvinyl chloride resins was suggested.

For example, U.S. Pat. No. 6,391,976 discloses use of methyl methacrylate and an acrylate monomer as a comonomer thereof and U.S. Pat. No. 6,221,966 discloses preparation of a processing aid by polymerization of a latex polymerized using alkyl acrylate as a major monomer, with methyl methacrylate.

On the other hand, high-molecular weight styrene-acrylonitrile copolymers have competitive price as compared to high-molecular weight acrylate processing aids, but disadvantageously causes deterioration in qualities upon foaming of polyvinyl chloride resins.

DISCLOSURE

Technical Problem

Therefore, the present invention has been made in view of the above problems, and it is one object of the present invention to provide a PVC foam processing aid which exhibits foam properties comparable to a high molecular weight acrylate processing aid using a high molecular weight styrene-acrylonitrile copolymer, and a method for preparing the same.

It is another object of the present invention to provide a polyvinyl chloride resin composition which exhibits improved foam moldability using the PVC foam processing aid.

Technical Solution

In accordance with one aspect of the present invention, provided is a PVC foam processing aid comprising 50 to 90% by weight of a styrene-acrylonitrile copolymer and 50 to 10% by weight of an alkyl methacrylate-alkyl acrylate copolymer, wherein the styrene-acrylonitrile copolymer has a weight average molecular weight (Mw) of 2,000,000 to 5,000,000 g/mol, and the alkyl methacrylate-alkyl acrylate copolymer has a weight average molecular weight (Mw) of 200,000 to 1,000,000 g/mol.

In accordance with another aspect of the present invention, provided is a method for preparing a PVC foam processing aid comprising polymerizing a styrene monomer with an acrylonitrile monomer in the presence of a polymerization initiator to obtain a styrene-acrylonitrile copolymer having a weight average molecular weight (Mw) of 2,000,000 to 5,000,000 g/mol, and adding 7.5 to 40% by weight of an alkyl methacrylate monomer and 2.5 to 10% by weight of an alkyl acrylate monomer to 50 to 90% by weight of the styrene-acrylonitrile copolymer obtained in the polymerization, and performing polymerization in the presence of a polymerization initiator to obtain a polymer having a structure in which an alkyl methacrylate-alkyl acrylate copolymer having a weight average molecular weight (Mw) of 200,000 to 1,000,000 g/mol surrounds the styrene-acrylonitrile copolymer.

In accordance with another aspect of the present invention, provided is a polyvinyl chloride resin composition, comprising a polyvinyl chloride resin and the PVC foam processing aid described above.

Hereinafter, the present invention will be described in more detail.

The present invention is characterized in providing a PVC foam processing aid which exhibits superior aggregation property and improves foam moldability of polyvinyl chloride resins.

Specifically, the PVC foam processing aid may comprise a styrene-acrylonitrile copolymer and an alkyl methacrylate-alkyl acrylate copolymer. For example, the PVC foam processing aid preferably comprises 50 to 90% by weight of a styrene-acrylonitrile copolymer and 50 to 10% by weight of an alkyl methacrylate-alkyl acrylate copolymer in that aggregation property is improved and deterioration in foam moldability of polyvinyl chloride resins, for example, increase in cell size due to non-uniform foaming upon foam processing is solved.

Specifically, the PVC foam processing aid may comprise 60 to 85% by weight of the styrene-acrylonitrile copolymer and 15 to 40% by weight of the alkyl methacrylate-alkyl acrylate copolymer.

For example, the styrene-acrylonitrile copolymer has a weight average molecular weight (Mw) of 2,000,000 to 5,000,000 g/mol, 2,000,000 to 4,000,000 g/mol, 3,000,000 to 4,000,000 g/mol, or 3,200,000 to 3,500,000 g/mol in order to improve foaming properties.

For example, the alkyl methacrylate-alkyl acrylate copolymer has a weight average molecular weight (Mw) of 200,000 to 1,000,000 g/mol, 300,000 to 850,000 g/mol, or 500,000 to 700,000 g/mol to improve foaming properties and aggregation property.

In addition, the styrene-acrylonitrile copolymer is present in an amount of 50 to 90% by weight with respect to the total weight of the PVC foam processing aid in order to improve aggregation property as well as foam moldability of polyvinyl chloride resins. Specifically, the styrene-acrylonitrile copolymer may be present in an amount of 60 to 85% by weight with respect to the total weight of the PVC foam processing aid.

In the present invention, the styrene-acrylonitrile copolymer preferably comprises the acrylonitrile monomer in an amount of 13 to 28% by weight or 18 to 22.5% by weight with respect to the total weight of the monomers constituting the PVC foam processing aid in terms of securing compatibility. For example, the acrylonitrile monomer comprises at least one selected from the group consisting of acrylonitrile, methacrylonitrile, fumaronitrile, α-chloronitrile, and α-cyanoethyl acrylonitrile.

In addition, the styrene monomer used for the styrene-acrylonitrile copolymer is present in an amount of 38 to 66% by weight or 42 to 59.5% by weight, based on the total weight of the monomers constituting the PVC foam processing aid in terms of suitably improving foam moldability.

The styrene monomer, for example, comprises at least one selected from the group consisting of styrene, α-methyl styrene, t-butyl styrene, chlorostyrene, and p-methyl styrene.

In another example, the styrene-acrylonitrile copolymer may further comprise an alkyl methacrylate monomer in an amount of 0.01 to 28% by weight, or 0.1 to 15% by weight, based on the total weight of the monomers constituting the PVC foam processing aid.

The alkyl methacrylate monomer, for example, comprises at least one selected from the group consisting of methyl methacrylate, n-butyl methacrylate, lauryl methacrylate, stearyl methacrylate, tridecyl methacrylate, i-butyl methacrylate, t-butyl methacrylate, 2-ethylhexyl methacrylate and cyclohexyl methacrylate.

Specifically, the styrene monomer and the acrylonitrile monomer may be present at a weight ratio of 50 to 80:50 to 20. That is, the styrene-acrylonitrile copolymer comprises 50 to 80% by weight of the styrene monomer and 20 to 50% by weight of the acrylonitrile monomer, based on 100% by weight in total.

In another example, the styrene-acrylonitrile copolymer comprises 50 to 70% by weight of the styrene monomer, 15 to 25% by weight of the acrylonitrile monomer and 15 to 25% by weight of the alkyl methacrylate monomer, based on 100% by weight in total of the monomers constituting the copolymer.

In another example, the styrene-acrylonitrile copolymer comprises 50 to 70% by weight of the styrene monomer, 15 to 25% by weight of the acrylonitrile monomer and 15 to 25% by weight of the alkyl methacrylate monomer, based on 100% by weight in total of the monomers constituting the copolymer and comprises 0.01 to 30 parts by weight of a comonomer, based on 100 parts by weight in total of the copolymer. Here, any type of comonomer commonly used in the art may be used as the comonomer without limitation.

The alkyl methacrylate-alkyl acrylate copolymer added to the styrene-acrylonitrile copolymer functions to provide a processing aid with superior aggregation property via control of glass transition temperature according to content thereof. Specifically, for example, the alkyl acrylate monomer is present in an amount of 2.5 to 10% by weight or 3 to 8% by weight, based on the total weight of the monomers constituting the PVC foam processing aid, in that particles can be aggregated within a normal powder particle size distribution range.

For example, the alkyl methacrylate-alkyl acrylate copolymer comprises 60 to 90% by weight of the alkyl methacrylate monomer and 10 to 40% by weight of the alkyl acrylate monomer, based on 100% by weight in total of the alkyl methacrylate-alkyl acrylate copolymer.

In another example, the alkyl methacrylate-alkyl acrylate copolymer comprises 60 to 90% by weight of the alkyl methacrylate monomer, 10 to 30% by weight of the alkyl acrylate monomer and 0.01 to 30% by weight of the comonomer, based on 100% by weight in total of the alkyl methacrylate-alkyl acrylate copolymer. Here, any type of comonomer commonly used in the art may be used as the comonomer without limitation.

In another example, the alkyl methacrylate-alkyl acrylate copolymer may be a copolymer surrounding the styrene-acrylonitrile copolymer.

In addition, the alkyl methacrylate monomer used for the alkyl methacrylate-alkyl acrylate copolymer is for example present in an amount of 7.5 to 40% by weight or 12 to 32% by weight, based on the total weight of the monomers constituting the processing aid from in terms of sufficiently improving aggregation property.

The alkyl methacrylate monomer, for example, comprises at least one selected from those suggested in the description of the styrene-acrylonitrile copolymer above.

The alkyl acrylate monomer, for example, comprises at least one selected from the group consisting of methyl acrylate, ethyl acrylate, n-butyl acrylate, lauryl acrylate, stearyl acrylate, 2-ethylhexyl acrylate, and cyclohexyl acrylate.

If necessary, the comonomer is for example present in an amount of 0.01 to 10% by weight. Here, any type of comonomer commonly used in the art may be used as the comonomer without limitation.

Any common polymerization method such as emulsion polymerization, suspension polymerization or solution polymerization may be used without particular limitation as a polymerization method used in the present invention.

Specifically, for example, the polymerization method may comprise polymerizing a styrene monomer with an acrylonitrile monomer in the presence of a polymerization initiator to obtain a styrene-acrylonitrile copolymer having a weight average molecular weight (Mw) of 2,000,000 to 5,000,000 g/mol (1), and adding 7.5 to 40% by weight of an alkyl methacrylate monomer and 2.5 to 10% by weight of an alkyl acrylate monomer to 50 to 90% by weight of the styrene-acrylonitrile copolymer and performing polymerization in the presence of a polymerization initiator to obtain a polymer having a structure in which an alkyl methacrylate-alkyl acrylate copolymer having a weight average molecular weight (Mw) of 200,000 to 1,000,000 g/mol surrounds the styrene-acrylonitrile copolymer (2).

In the first step, 0.001 to 28% by weight of an alkyl methacrylate monomer, based on the total weight of the monomers constituting the PVC foam processing aid, may be further added during polymerization.

That is, the styrene-acrylonitrile copolymer may comprise 50 to 70% by weight of the styrene monomer, 15 to 25% by weight of the acrylonitrile monomer and 15 to 25% by weight of the alkyl methacrylate monomer, based on 100% by weight in total.

In addition, in the second step, the alkyl methacrylate monomer and the alkyl acrylate monomer are added in a total amount of 59 to 6% by weight, to 41 to 94% by weight of the product obtained in the first step, followed by polymerization.

A well-known initiator such as organic peroxides, inorganic peroxides and nitrogen oxides may be used as the initiator for polymerization. Examples of the initiator include organic peroxides such as t-butyl hydroperoxide, 1,1,3,3-tetramethylbutyl hydroperoxide, succinic acid peroxide, peroxy maleic acid tert-butyl ester, cumene hydroperoxide and benzoyl peroxide, inorganic peroxides such as potassium persulfate and sodium persulfate, and fat-soluble initiators such as azobisisobutyronitrile.

In addition, the initiator may be a redox initiator obtained by combining sodium sulfite, sodium thiosulphate, sodium metabisulfite, sodium bisulfite, sodium dithionite, sodium 2-hydroxy-2-sulfonatoacetic acid, ascorbic acid, hydroxyacetone or ferrous sulfate with a reducing agent of an EDTA complex.

The polymerization initiator may be added in an amount of 0.003 to 0.3 parts by weight, 0.004 to 0.1 parts by weight, or 0.004 to 0.007 parts by weight, based on 100 parts by weight of the total monomers constituting the PVC foam processing aid.

Of these, a well-known surfactant may be used for emulsion polymerization. For example, the surfactant may include at least one selected from anionic surfactants such as alkyl sodium sulfonate, alkyl benzene sodium sulfonate, sodium dioctyl sulfonate, sodium lauryl sulfate and sodium fatty acid, or non-ionic surfactants such as products of reaction with alkyl phenols, aliphatic alcohols, propylene oxide or ethylene oxide.

Furthermore, at least one selected from common additives such as antioxidants, UV absorbers and UV stabilizers may be blended, if necessary.

For example, the polymerization of each of the first and second steps may be performed at 30 to 55° C. or 35 to 45° C. for 3.5 to 5.5 hours or 3.5 to 5 hours.

The product of the second step is obtained as a powder by aggregation. The aggregation temperature is for example 58 to 97° C. or 66 to 80° C.

The powder thus obtained is mixed with polyvinyl chloride resins in need of improved foam moldability, to provide a composition. In another example, the obtained powder may be mixed in an amount of 1 to 20 parts by weight, or 1 to 10 parts by weight with 100 parts by weight of the polyvinyl chloride resin.

Advantageous Effects

As apparent from the fore-going, the present invention advantageously provides a PVC foam processing aid which exhibits superior aggregation property and effectively reinforces foam moldability and aggregation property of polyvinyl chloride (PVC) resins, and a polyvinyl chloride resin composition comprising the same.

BEST MODE

Hereinafter, the present invention will be described in more detail with reference to the following examples. However, these examples are not to be construed as limiting the scope of the invention.

Examples 1 to 5 and Comparative Examples 1 to 4

Example 1

160 parts by weight of deionized water, 0.8 parts by weight of an emulsifier (KAO Cooperation, Latemul ASK), 0.01 parts by weight of sodium ethylenediaminetetraacetate and 0.001 parts by weight of ferrous sulfate were added to a 5 L polymerization reactor equipped with a stirrer, a nitrogen gas was sufficiently charged in the reactor and the temperature was elevated to 40° C.

Then, 52.5 parts by weight of styrene and 22.5 parts by weight of acrylonitrile were added to the reactor, 0.05 parts by weight of sodium formaldehyde sulfoxylate and 0.005 parts by weight of tert-butyl hydroperoxide were then added thereto and polymerization was performed for 6 hours to obtain a first step copolymer latex having an average particle diameter of 120 nm (polymerization conversion ratio: 96%, Mw of first step copolymer: 3,500,000 g/mol).

The average particle diameter was measured using a submicron particle sizer (NICOMP 380, Particle Sizing Systems (PSS) Inc.).

In a second step, 0.2 parts by weight of an emulsifier (KAO COOPERATION, Latemul ASK), 0.002 parts by weight of sodium ethylenediaminetetraacetate and 0.0002 parts by weight of ferrous sulfate were added to the reactor, 20 parts by weight of methyl methacrylate and 5 parts by weight of butyl acrylate were added thereto as second step monomers, 0.01 parts by weight of sodium formaldehyde sulfoxylate and 0.005 parts by weight of tert-butyl hydroperoxide were added thereto and polymerization was performed at 40° C. for 4 hours to obtain a second step copolymer latex having an average particle diameter of 140 nm (polymerization conversion ratio: 98%, Mw of second step copolymer: 600,000 g/mol).

The obtained latex was aggregated with calcium chloride, washed with water and dried to obtain a powder.

Example 2

The same process as in Example 1 was repeated, except that 17 parts by weight of methyl methacrylate and 8 parts by weight of butyl acrylate were added as the second step monomers. In this case, the second step copolymer had a Mw of 600,000 g/mol.

Example 3

The same process as in Example 1 was repeated, except that 59.5 parts by weight of styrene and 25.5 parts by weight of acrylonitrile were added as the first step monomers and 12 parts by weight of methyl methacrylate and 3 parts by weight of butyl acrylate were added as the second step monomers.

In this case, the first step copolymer had a Mw of 3,500,000 g/mol and the second step copolymer had a Mw of 500,000 g/mol.

Example 4

The same process as in Example 1 was repeated, except that 42 parts by weight of styrene and 18 parts by weight of acrylonitrile were added as the first step monomers and 32 parts by weight of methyl methacrylate and 8 parts by weight of butyl acrylate were added as the second step monomers.

In this case, the first step copolymer had a Mw of 3,500,000 g/mol and the second step copolymer had a Mw of 700,000 g/mol.

Example 5

The same process as in Example 1 was repeated, except that 42 parts by weight of styrene, 18 parts by weight of acrylonitrile and 15 parts by weight of methyl methacrylate were added as the first step monomers.

In this case, the first step copolymer had a Mw of 3,200,000 g/mol and the second step copolymer had a Mw of 500,000 g/mol.

Comparative Example 1

The same process as in Example 1 was repeated, except that 70 parts by weight of styrene and 30 parts by weight of acrylonitrile were added as the first step monomers and the obtained first step copolymer latex was aggregated with calcium chloride, washed with water and dried to obtain a powder, without polymerization of the second step.

In this case, the first step copolymer had a Mw of 3,500,000 g/mol.

Comparative Example 2

The same process as in Example 1 was repeated, except that 80 parts by weight of methyl methacrylate and 20 parts by weight of butyl acrylate were added as the first step monomers and the obtained first step copolymer latex was aggregated with calcium chloride, washed with water and dried to obtain a powder, without polymerization of the second step.

In this case, the first step copolymer had a Mw of 700,000 g/mol.

Comparative Example 3

The same process as in Example 1 was repeated, except that 0.04 parts by weight of tert-butyl hydroperoxide was added as an initiator and polymerization was performed at 60° C. for 3 hours during polymerization of the second step.

In this case, the second step copolymer had a Mw of 100,000 g/mol.

Comparative Example 4

The same process as in Example 1 was repeated, except that 0.01 parts by weight of tert-butyl hydroperoxide was added as an initiator and polymerization was performed at 60° C. for 4 hours during polymerization of the first step.

In this case, the first step copolymer had a Mw of 1,800,000 g/mol and the second step copolymer had a Mw of 700,000 g/mol.

Comparative Example 5

The same process as in Example 1 was repeated, except that 0.002 parts by weight of tert-butyl hydroperoxide was added as an initiator and polymerization was performed at 35° C. for 6 hours during polymerization of the second step.

In this case, the second step copolymer had a Mw of 1,200,000 g/mol.

4 parts by weight of each polymer powder obtained in Examples 1 to 5 and Comparative Examples 1 to 5 was mixed with 100 parts by weight of a polyvinyl chloride resin (LG080, produced by LG Chem. LTD.), 4 parts by weight of a thermal stabilizer (OTL-9, produced by Sunkyung Chemical Co., Ltd.), 7 parts by weight of calcium carbonate, 2 parts by weight of a lubricant, 2 parts by weight of $TiO_2$, and 0.7 parts by weight of a foaming agent (azodicarbonamide) using a Hensel mixer while heating to 115° C., and was foam-molded using a Haake twin extruder equipped with a rectangular slit die to produce a test specimen having a thickness of 5 mm and an area of 30 mm.

Physical values measured in accordance with the test items are shown in the following Table 1.

<Test Items>

Aggregation temperature (° C.): a temperature at which a powder content of a copolymer latex passing through a 200-mesh sieve (size: 0.075 mm), after aggregation and drying, reached 20% or less was measured (powdery polymer having a suitable size cannot be produced when aggregation temperature is excessively high or low).

Torque upon foaming extrusion (%), melt pressure (bar), melt temperature (° C.): a value measured in a Hakke foaming extruder (extrusion temperature: C1/C2/A/D=170/178/180/178° C., screw rate: 25 rpm).

Amount of extruded product upon foaming extrusion (g/min): a weight of molded product obtained from the extruder for one minute upon foam molding.

Specific gravity of foams upon foaming extrusion (g/cc): a value measured using a specific gravity meter.

Size of foam cells upon foaming extrusion (mm): an average of 50 cell size values measured using an optical microscope.

TABLE 1

| Items | Aggregation temperature (° C.) | Torque (%) | Melt pressure (Bar) | Amount of extruded product (g/min) | Specific gravity of foams (g/cc) | Size of foam cells (mm) |
| --- | --- | --- | --- | --- | --- | --- |
| Ex. 1 | 71 | 79 | 124.2 | 68.3 | 0.427 | 101 |
| Ex. 2 | 66 | 84 | 125.0 | 68.7 | 0.466 | 97 |
| Ex. 3 | 80 | 80 | 121.8 | 67.7 | 0.489 | 91 |
| Ex. 4 | 70 | 84 | 125.8 | 68.8 | 0.471 | 99 |
| Ex. 5 | 72 | 87 | 135.7 | 68.5 | 0.409 | 111 |
| Comp. Ex. 1 | — | 72 | 112 | 62.5 | 0.713 | 69 |
| Comp. Ex. 2 | 64 | 70 | 104.7 | 66.1 | 0.719 | 62 |
| Comp. Ex. 3 | 68 | 70 | 115.5 | 67.0 | 0.612 | 83 |
| Comp. Ex. 4 | 69 | 76 | 114.0 | 64.0 | 0.580 | 74 |
| Comp. Ex. 5 | 76 | 75 | 114.7 | 61.1 | 0.655 | 72 |

As can be seen from Table 1 above, Examples 1 to 5 enabled easy formation of powders at temperatures of 90° C. or less and facilitated foaming extrusion, thus providing a high amount of extruded product, improved foaming properties and low specific gravity of foams.

Comparative Example 1 wherein a second step copolymer with a suitable molecular weight was not used exhibited high foam specific gravity and a low extruded product amount. In addition, powder size was disadvantageously excessively small due to high Tg.

Comparative Example 2 wherein a styrene-acrylonitrile copolymer with a high-molecular weight was not used in the first step, Comparative Example 4 wherein a molecular weight of the copolymer of the first step was low exhibited deterioration in foaming properties, and Comparative Examples 3 and 5 wherein the molecular weight of the second step was excessively high or low exhibited deterioration in foaming properties.

An additional test was performed in the same manner as in Example 1 in order to confirm variation in physical properties according to variations in monomer contents and molecular weights and results are shown in the following Table 2.

Comparative Example 6

The same process as in Example 1 was repeated, except that 66.5 parts by weight of styrene and 28.5 parts by weight of acrylonitrile were added as first step monomers and 4 parts by weight of methyl methacrylate and 1 part by weight of butyl acrylate were added as second step monomers.

In this case, the first step copolymer had a Mw of 3,500,000 g/mol and the second step copolymer had a Mw of 300,000 g/mol.

Comparative Example 7

The same process as in Example 1 was repeated, except that 28 parts by weight of styrene and 12 parts by weight of acrylonitrile were added as first step monomers and 48 parts by weight of methyl methacrylate and 12 parts by weight of butyl acrylate were added as second step monomers.

In this case, the first step copolymer had a Mw of 3,500,000 g/mol and the second step copolymer had a Mw of 900,000 g/mol.

Comparative Example 8

The same process as in Example 1 was repeated, except that 23 parts by weight of methyl methacrylate and 2 parts by weight of butyl acrylate were added as second step monomers.

In this case, the first step copolymer had a Mw of 3,500,000 g/mol and the second step copolymer had a Mw of 500,000 g/mol.

Comparative Example 9

The same process as in Example 1 was repeated, except that 12.5 parts by weight of methyl methacrylate and 12.5 parts by weight of butyl acrylate were added as second step monomers.

In this case, the first step copolymer had a Mw of 3,500,000 g/mol and the second step copolymer had a Mw of 700,000 g/mol.

Comparative Example 10

The same process as in Example 1 was repeated, except that 67.5 parts by weight of styrene and 7.5 parts by weight of acrylonitrile were added as first step monomers.

In this case, the first step copolymer had a Mw of 3,700,000 g/mol and the second step copolymer had a Mw of 600,000 g/mol.

Comparative Example 11

The same process as in Example 1 was repeated, except that 37.5 parts by weight of styrene and 37.5 parts by weight of acrylonitrile were added as first step monomers.

In this case, the first step copolymer had a Mw of 2,500,000 g/mol and the second step copolymer had a Mw of 600,000 g/mol.

TABLE 2

| Items | Aggregation temperature (° C.) | Torque (%) | Melt pressure (Bar) | Amount of extruded product (g/min) | Specific gravity of foams (g/cc) | Size of foam cells (mm) |
|---|---|---|---|---|---|---|
| Comp. Ex. 6 | 98 | 76 | 113.8 | 62.3 | 0.627 | 77 |
| Comp. Ex. 7 | 68 | 76 | 114.2 | 61.5 | 0.604 | 78 |
| Comp. Ex. 8 | — | 79 | 120.7 | 66.0 | 0.487 | 95 |
| Comp. Ex. 9 | 57 | 76 | 113.4 | 61.8 | 0.599 | 74 |
| Comp. Ex. 10 | 72 | 72 | 107.1 | 61.2 | 0.724 | 66 |
| Comp. Ex. 11 | 69 | 76 | 114.2 | 61.0 | 0.609 | 84 |

As can be seen from Table 2 above, Comparative Examples 6 and 7 wherein the content of the copolymer of the second step was excessively high or low had problems of high foam specific gravity and low extruded product amount. In addition, Comparative Example 6 wherein the content of the copolymer of the second step was insufficient and Comparative Example 8 wherein the content of butyl acrylate among the monomers of the second step was low had a problem of excessively small powder size due to high Tg.

In addition, Comparative Example 9 wherein the content of butyl acrylate among the monomers of the second step was high enabled easy aggregation, but had a problem of deteriorated foaming properties.

Furthermore, Comparative Examples 10 and 11 wherein the content of acrylonitrile in the copolymer of the first step was high or low exhibited deterioration in foaming properties due to low compatibility with PVC.

What is claimed is:

1. A polyvinylchloride (PVC) foam processing aid comprising:
   50 to 90% by weight of a styrene-acrylonitrile copolymer; and
   50 to 10% by weight of an alkyl methacrylate-alkyl acrylate copolymer,
   wherein the styrene-acrylonitrile copolymer has a weight average molecular weight (Mw) of 2,000,000 to 5,000,000 g/mol, and the alkyl methacrylate-alkyl acrylate copolymer has a weight average molecular weight (Mw) of 200,000 to 1,000,000 g/mol,
   wherein the alkyl methacrylate-alkyl acrylate copolymer surrounds the styrene-acrylonitrile copolymer, and
   wherein the amount of an acrylonitrile monomer and a styrene monomer in the styrene-acrylonitrile copolymer is 13 to 28% by weight and 38 to 66% by weight, respectively, based on 100% by weight of the total monomer content of the PVC foam processing aid, and
   wherein the amount of an alkyl acrylate monomer and an alkyl methacrylate monomer in the alkyl methacrylate-alkyl acrylate copolymer is 2.5 to 10% by weight and 7.5 to 40% by weight, respectively, based on 100% by weight of the total monomer content of the PVC foam processing aid.

2. The PVC foam processing aid according to claim 1, wherein the styrene-acrylonitrile copolymer comprises a styrene monomer and an acrylonitrile monomer at a weight ratio of 50 to 80:50 to 20.

3. The PVC foam processing aid according to claim 1, wherein the styrene-acrylonitrile copolymer is obtained by polymerizing the styrene and acrylonitrile monomers with the alkyl methacrylate monomer.

4. The PVC foam processing aid according to claim 3, wherein the styrene-acrylonitrile copolymer comprises 50 to 70% by weight of the styrene monomer, 15 to 25% by weight of the acrylonitrile monomer and 15 to 25% by weight of the alkyl methacrylate monomer, based on 100% by weight of the styrene-acrylonitrile copolymer and is obtained by polymerizing the contents of the monomers.

5. The PVC foam processing aid according to claim 1, wherein the alkyl methacrylate-alkyl acrylate copolymer comprises 60 to 90% by weight of the alkyl methacrylate monomer and 10 to 40% by weight of the alkyl acrylate monomer, based on 100% by weight of the alkyl methacrylate-alkyl acrylate copolymer and is obtained by polymerizing the contents of the monomers.

6. The PVC foam processing aid according to claim 5, wherein the alkyl acrylate monomer comprises at least one selected from the group consisting of methyl acrylate, ethyl acrylate, n-butyl acrylate, lauryl acrylate, stearyl acrylate, 2-ethylhexyl acrylate, and cyclohexyl acrylate.

7. The PVC foam processing aid according to claim 3, wherein the alkyl methacrylate monomer comprises at least one selected from the group consisting of methyl methacrylate, n-butyl methacrylate, lauryl methacrylate, stearyl methacrylate, tridecyl methacrylate, i-butyl methacrylate, t-butyl methacrylate, 2-ethylhexyl methacrylate and cyclohexyl methacrylate.

8. The PVC foam processing aid according to claim 2, wherein the styrene monomer comprises at least one selected from the group consisting of styrene, α-methyl styrene, t-butyl styrene, chlorostyrene, and p-methyl styrene.

9. The PVC foam processing aid according to claim 2, wherein the acrylonitrile monomer comprises at least one selected from the group consisting of acrylonitrile, methacrylonitrile, fumaronitrile, α-chloronitrile, and α-cyanoethyl acrylonitrile.

10. A method for preparing a polyvinylchloride (PVC) foam processing aid comprising:
polymerizing a styrene monomer with an acrylonitrile monomer in the presence of a polymerization initiator to obtain a styrene-acrylonitrile copolymer having a weight average molecular weight (Mw) of 2,000,000 to 5,000,000 g/mol; and
adding 7.5 to 40% by weight of an alkyl methacrylate monomer and 2.5 to 10% by weight of an alkyl acrylate monomer to 50 to 90% by weight of the styrene-acrylonitrile copolymer and performing polymerization in the presence of a polymerization initiator to obtain a polymer having a structure in which an alkyl methacrylate-alkyl acrylate copolymer having a weight average molecular weight (Mw) of 200,000 to 1,000,000 g/mol surrounds the styrene-acrylonitrile copolymer.

11. The method according to claim 10, wherein the polymerizing the styrene monomer with the acrylonitrile monomer comprises polymerizing 50 to 70% by weight of the styrene monomer, 15 to 25% by weight of the acrylonitrile monomer and 15 to 25% by weight of the alkyl methacrylate monomer, based on 100% by weight in total of the styrene-acrylonitrile copolymer.

12. The method according to claim 10, further comprising aggregating the polymer to obtain a powder.

13. A polyvinyl chloride resin composition comprising:
a polyvinyl chloride resin; and
the PVC foam processing aid according to claim 1.

14. The polyvinyl chloride resin composition according to claim 13, wherein the composition comprises 100 parts by weight of the polyvinyl chloride resin and 1 to 20 parts by weight of the PVC foam processing aid.

15. The PVC foam processing aid according to claim 5, wherein the alkyl methacrylate monomer comprises at least one selected from the group consisting of methyl methacrylate, n-butyl methacrylate, lauryl methacrylate, stearyl methacrylate, tridecyl methacrylate, i-butyl methacrylate, t-butyl methacrylate, 2-ethylhexyl methacrylate and cyclohexyl methacrylate.

16. The PVC foam processing aid according to claim 3, wherein the styrene monomer comprises at least one selected from the group consisting of styrene, α-methyl styrene, t-butyl styrene, chlorostyrene, and p-methyl styrene.

17. The PVC foam processing aid according to claim 4, wherein the styrene monomer comprises at least one selected from the group consisting of styrene, α-methyl styrene, t-butyl styrene, chlorostyrene, and p-methyl styrene.

18. The PVC foam processing aid according to claim 3, wherein the acrylonitrile monomer comprises at least one selected from the group consisting of acrylonitrile, methacrylonitrile, fumaronitrile, α-chloronitrile, and α-cyanoethyl acrylonitrile.

19. The PVC foam processing aid according to claim 4, wherein the acrylonitrile monomer comprises at least one selected from the group consisting of acrylonitrile, methacrylonitrile, fumaronitrile, α-chloronitrile, and α-cyanoethyl acrylonitrile.

* * * * *